United States Patent [19]

Templeton

[11] 4,223,885
[45] Sep. 23, 1980

[54] GUIDE ARM ASSEMBLY

[75] Inventor: William B. Templeton, Howell, Mich.

[73] Assignee: Burroughs Corporation, Detroit, Mich.

[21] Appl. No.: 959,909

[22] Filed: Nov. 13, 1978

[51] Int. Cl.³ .......................................... B65H 31/26
[52] U.S. Cl. .................................................. 271/220
[58] Field of Search ................ 271/220, 224, 208, 209

[56] References Cited

PUBLICATIONS

IBM Technical Disclosure Bulletin, vol. 7, No. 8, Jan. 1965, "Document Stacker", H. P. Braen et al.
IBM Technical Disclosure Bulletin, vol. 18, No. 7, pp. 2059, 2060, Dec. 1975, "Variable Size Exit Tray", D. F. Colglazier et al.

*Primary Examiner*—Richard A. Schacher
*Attorney, Agent, or Firm*—Carl Fissell, Jr.; Delbert P. Warner; Charles E. Quarton

[57] ABSTRACT

A demountable back-up item supporting device for an item sorter pocket receptacle of a sorter reader comprises a horizontally elongated fence-like member having a mounting pedestal disposed at each opposite end thereof. A central opening extends from one end of said member to the other end. A highly flexible, relatively thin, deflectable member is attached at opposite ends to said fence-like member and extends within said central opening in a bowed formation having a constantly changing radius of curvature. Oppositely disposed, demountable brushes extend outwardly away from one end of said fence like member. A thin, flat, elongated contacting element is demountably attached to the brush retaining end for cooperative engagement with an associated photo optical switch structure. The fence-like member is vertically bowed so as to maintain the columnated attitude of the items being sorted as the items contact this member. The inboard end of the member is angled away from the main plain thereof so as to force the items away therefrom and into the item pocket.

9 Claims, 6 Drawing Figures

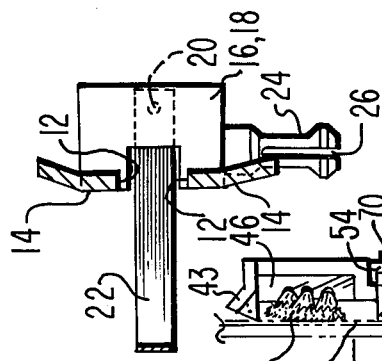
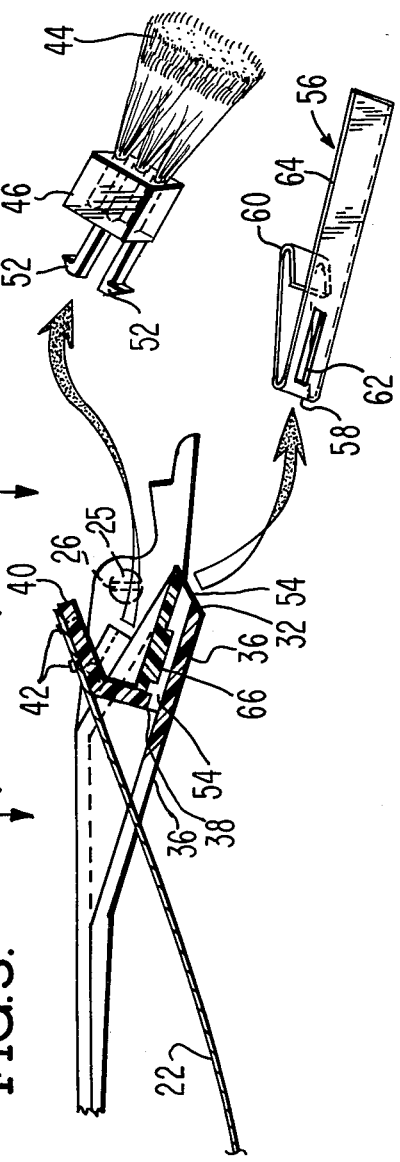
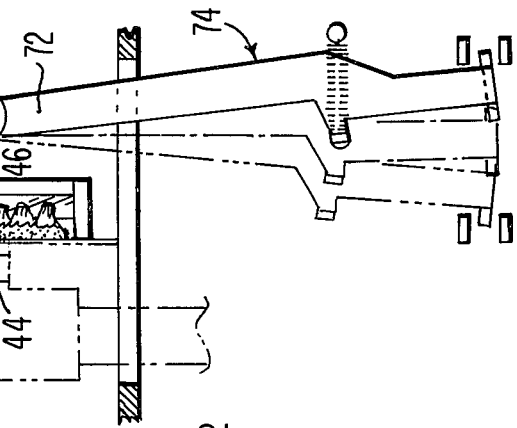
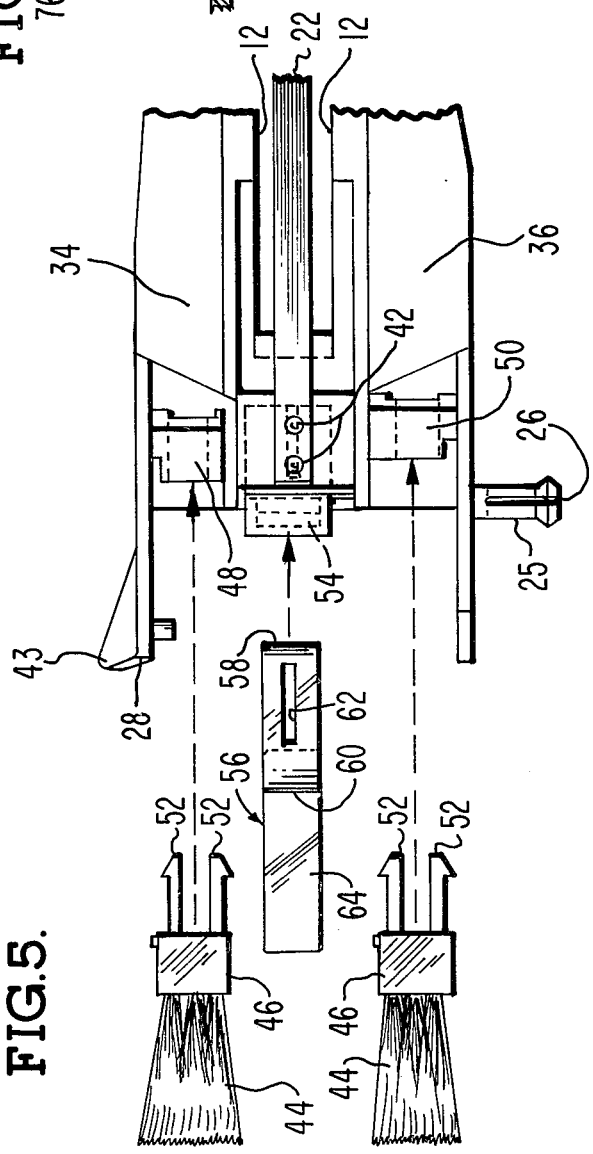

GUIDE ARM ASSEMBLY

The present invention relates to and includes by reference those portions of U.S. application Ser. No. 25,913 filed Apr. 2, 1979 in the name of William B. Templeton and assigned to the same assignee as the present invention which relates to the subject matter of the present invention.

BACKGROUND OF THE INVENTION

1. Field of the Invention

This invention relates to high speed item/sorter/reader apparatus and more particularly relates to item/sorter pocket or receptacle stacking and handling apparatus and still more specifically to means within an item/sorter pocket or receptacle for stacking and handling items at high speed without interference, jams or collisions therebetween.

2. History of the Prior Art

Modern item/sorter/reader apparatus must be able to read, move and stack relatively flimsy items such as thin paper check stock as well as thicker punch card stock at extremely high speeds along relatively extensive and irregular pathways. Flimsy paper stock is subject to widely varying aerodynamic problems associated with capture and free flight of such documents. Thicker card stock also presents problems as a result of bending, folding, mutilating, etc. One corner bent or a dog eared item can jam up an entire sorting pathway. In sorter/readers where advantage is taken of the free flight (ballistic characteristics) of the item particularly as the item enters and is received by the item pocket receptacle, collision, jams, overlaps, etc., are a major nuisance. Delays in operation due to down time resulting from such problems are usual and costly and, which is worse, document items are often damaged or destroyed and must be replaced because of these problems.

It is an object therefore of the present invention to solve these and other associated problems in a new, novel and heretofore unobvious fashion by providing means within the item pocket receptacle for automatically moving each incoming item out of the way of the next incoming item effectively avoiding collision, jams and overlaps.

An additional object of the invention is to provide a rigid but demountable back-up member for a sorter/reader item pocket including means for preventing the items from bouncing backwardly away from the terminal wall within the pocket and into the pathway of incoming items.

Still another important object of the invention is to provide automatic means within the sorter item pocket for opening and maintaining a clear entry path for incoming items without resort to air pressure, and other prior art means.

SUMMARY OF THE INVENTION

Apparatus in accordance with the teachings of the subject invention comprises a rigid, elongated light weight guide arm assembly in the form of a fence-like member tapering in both length and thickness from a fairly thick, enlarged end portion to a relatively narrowed and thin portion at the opposite end. An elongated rectangular slot or opening extends substantially from end to end of the guide arm member. A flat, narrow, resilient spring like member is secured at its opposite ends to respective opposite ends of the guide arm in such fashion as to be bowed throughout its length in the shape of an enlarged curve of constantly changing radius with the greater or sharpest radius of curvature at the narrowed end portion of the arm. A compressable mounting member integral with the arm structure is disposed at each end thereof providing means for mounting and dismounting the complete assembly by simple insertion pressure. The arm is linearly bowed throughout its length with the bow terminating at the thicker end portion and an angled portion adapted to demountably secure a pair of oppositely disposed brush like members separated by an intermediate demountable flexible blade like member, all three members extending at an angle from the arm and outwardly into the path of items entering the item pocket. The extreme upper edge portion of the thicker end of the arm is angled sharply upwardly and backwardly toward the terminal portion of the arm forming an integral support for relatively tall and flimsy entering items.

The guide arm assembly is adapted to be demountably pluggably disposed within the sorter/reader item pocket in a vertical upright position so as to form the back wall of the pocket and so that the flexible blade like member is in contact with the actuator arm of an associated contact switch member within the sorter pocket.

BRIEF DESCRIPTION OF THE DRAWINGS

FIG. 3 is a partial sectional view along the line 3—3 of FIG. 1 illustrating both the brush members and the flexible blade like member in detail, dismounted from the guide arm;

FIG. 4 is a sectional view along the line 4—4 of FIG. 1 illustrating the vertical bowed condition of the guide arm assembly as well as the flexible, plug-like stand off pedestals for mounting the guide arm to the item/sorter reader;

FIG. 5 is a side elevational view along the line 5—5 of FIG. 3 with the arm mounted normally i.e. on edge, illustrating the means by which both the brush assemblies and the flexible blade assembly are demountably secured to the guide arm; and FIG. 6 is an interior end view of the guide arm assembly as it would appear when mounted in a item/sorter reader.

BRIEF DESCRIPTION OF THE INVENTION

The present invention relates to improvements in item/sorter/reader pocket stacking apparatus and to the back-up support assembly disposed within the sorter pocket area for stacking the items on edge in a specified order without collision between incoming items and without overlap or interference of items. Modern item/sorter/readers are capable of handling many types of items documents from relatively stiff card stock such as eighty column punch card material to relatively thin and flimsy paper stock employed as personal bank checks. Each type of material has associated problems peculiar to that type of material yet the sorter/reader must be able, within relatively wide limits, to handle all kinds of items equally efficiently. Since most sorter/reader apparatus sorts and stacks items on edge and since most flimsy check item stock is not self supporting, and may be relatively wide and relatively long which makes the item rather floppy, back-up support must be provided therefor to enable the apparatus to function easily, rapidly and efficiently without jams, missorts and collisions. Also, since the items are moved at a relatively high speed means must be provided to assure that one incoming item doesn't overlap another previously entered item or directly collide with such item. Means should also be provided to accommodate the apparatus to the obvious wear problems encountered in continued use over long periods of time.

These and other associated problems are solved by the present invention in a new, novel and unobvious manner as will now be described with reference to the various figures of the drawings.

Figure 1:
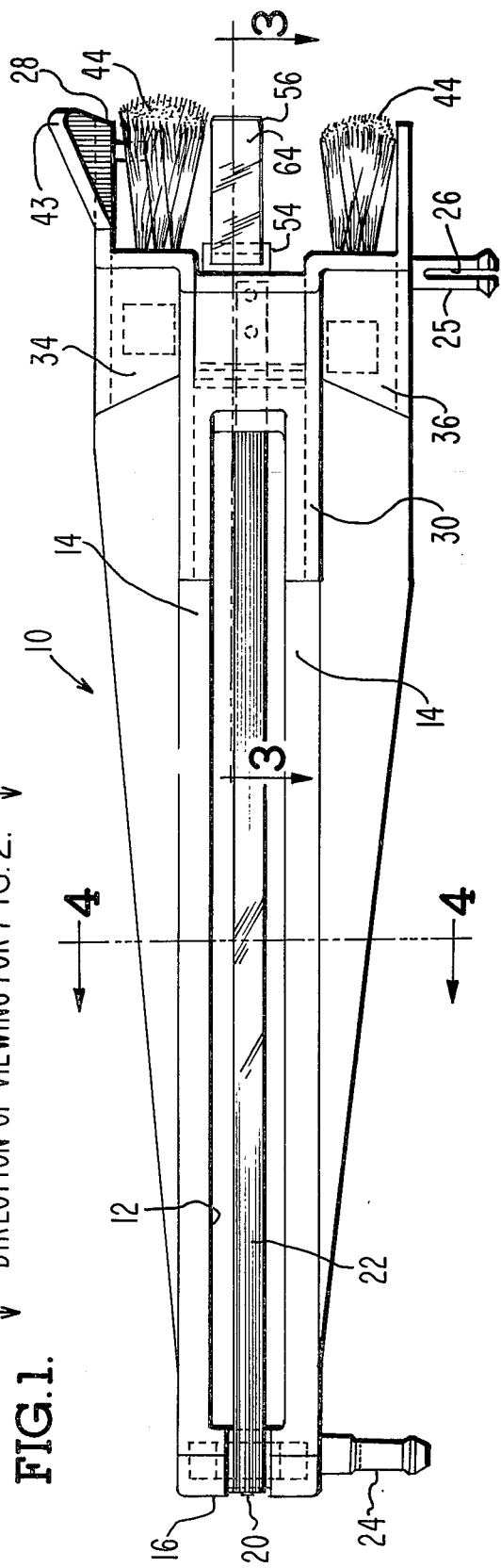
FIG. 1 is a side elevational view of apparatus embodying the present invention.

As seen most clearly in FIG. 1, the guide arm assembly embodying the present invention comprises a horizontal, elongated, fence-like structure 10 provided with a horizontal, elongated, rectangular aperture 12 extending substantially from one end thereof to the other. The member 10 is bowed from one vertical edge to the other as indicated in FIG. 4 by reference numerals 14—14 for purposes to be explained later on herein. The leading end 16 of apparatus 10 includes an integral portion 18, FIG. 2, at right angles to the main body portion of member 10 providing attachment means 20 for one end of a wave spring 22 whose function will be described hereinafter. Integral mounting posts or pedestals 24 and 25, axially split as at 26 to provide sufficient insertion and release force, enables the assembly 10 to be mounted and dismounted at will from associated apparatus with which it is operably associated.

The opposite or trailing end 28 of member 10 is irregularly shaped and provided with a straight edge portion 30 straddling a portion of aperture 12 as seen in FIG. 1 and angled outwardly away from the main plane of member 10 terminating in a reversely angled edge portion 32. Upper and lower portions 34 and 36, FIG. 1, respectively, are inwardly offset from portion 30 and inwardly angled as seen at 38 in FIG. 2. The rear mid surface adjacent to the trailing end of the angled portion 30 of member 10 is provided with an integral outwardly angled flat, flange 40 providing attachment means 42 for the opposite inboard end of wave spring 22. The upper rear terminal edge 43 of member 10 is flared or angled upwardly and rearwardly as seen in FIG. 1 away from the main body of member 10.

The structure embodying the present invention operates in conjunction with certain photo-optical switch apparatus as described more particularly in previously referred to U.S. patent application Ser. No. 25,913 filed on Apr. 2, 1979 in the name of William B. Templeton and assigned to the same assignee as the present invention. As seen in FIGS. 3 through 6 inclusive with primary reference to FIG. 5, in order to prevent "bounce back" of items as each item bottoms within the item/-sorter receptacle pocket (not shown), a pair of very soft and finely bristled brushes 44 secured in a double pronged support 46 are demountably, receivably mounted in respective upper and lower receptacles 48 and 50. Insertion pressure by an operator is sufficient to cause the reversely angled tines 52 to snap back over the inboard edge of each receptacle 48 and 50 effectively retaining each brush therein. Removal or dismounting of the brushes is accomplished simply by compressing the tines 52 and pulling the brush backwardly out of its receptacle.

Demountably secured within an intermediate receptacle 54 (FIGS. 1, 3, 5 and 6) is a flat, thin, elongated, hard surfaced, resilient, flexible, member 56 formed of plastic or similar dielectric material. Member 56 is cut from thin sheet plastic bent back upon itself twice as at 58 and 60, FIG. 3 and provided with an elongated rectangular slot 62 close to the first bend 58 therein. The longer end 64 of member 56 provides handling means for inserting member 56 into receptacle 54 while the slot 62 is adapted to engage and seat (snap) over the projection 66 in the roof of the receptacle 54. The forwardly projecting end 64 of member 56 is adapted to operably engage the items 68 on one side, FIG. 6, and the nose 70 of actuator 72 of two positioned photo-optical switch 74 on the other side thereof. A back-up flag 76 such as that described and claimed in co-pending U.S. patent application Ser. No. 953,647 filed Oct. 23, 1978 in the name of William B. Templeton for an Item Sorting Flag and Switch Apparatus and assigned to the same assignee as the present invention supports the stacked items on the opposite side of the pocket receptacle (not shown) from the gage assembly 10.

From the foregoing description of the invention it is readily apparent that the back-up gate assembly 10 is or may be readily mounted and dismounted relative to the base apparatus with which it is to be employed by means of the two pedestals 24 and 25 disposed at opposite ends thereof. Also, as brush wear develops through prolonged use it is a simple and relatively easy matter to replace the brushes 44—44 by pressing the tines 52 together slightly and pulling the brushes out of their mounting receptacles 48. Similarly it is a relatively simple matter to release the flat flexible member by depressing the inboard end close to bend 58 slightly (which disengages the slot 62 from the projection 66) and simply pulling the longer end 64 out of the associated receptacle.

UTILIZATION AND OPERATION

With the gate assembly 10 positioned on the base member (not shown), that is, with the pedestals 24 and 25 received in the respective apertures the gate 10 is disposed in vertical orientation with the smaller end thereof adjacent to the entering items and the larger end thereof close to the terminal end of the item pocket receptacle. Each item 68 leaves the sorting pathway in a columnated or bowed condition relative to the item width (this tends to rigidify the otherwise flimsy item material such as paper checks enabling them to partake of the free flight condition within the pocket stacking area). As earlier pointed out herein the bowed condition is maintained by means of the vertical bowed shape of the gate assembly 10 (see FIG. 4 particularly).

Figure 2:
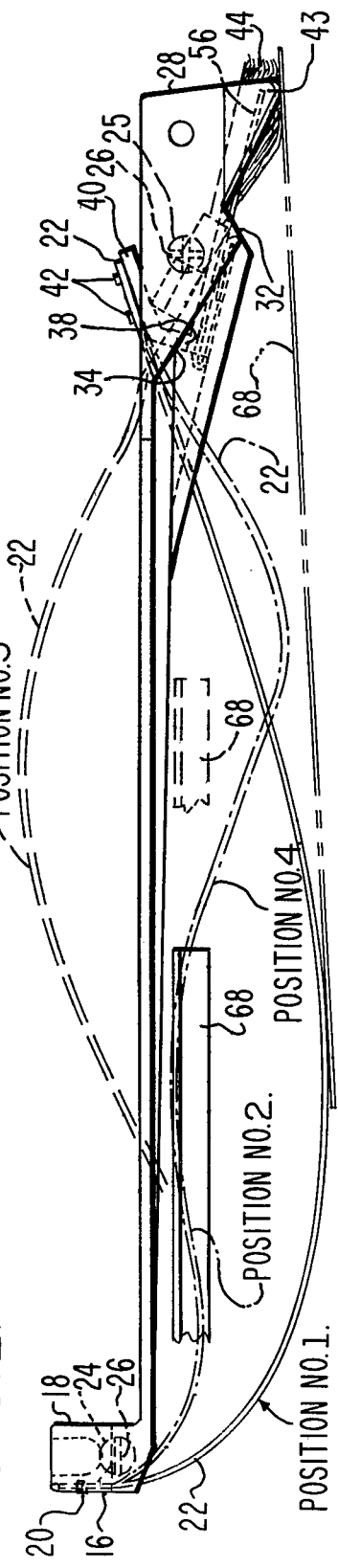
FIG. 2 is a top plan view of the apparatus of FIG. 1 illustrating the wave like motion of the spring member when contacted by an item.

As the item 68 enters the pocket area the leading edge of the item strikes or engages the left end portion of wave spring 22 at position number one (FIG. 2). As seen most clearly in this figure the resilience of the spring 22 combined with the entering force and bowed condition of the item 68 forces or pushes the wave spring 22 bending it horizontally backwardly (toward the top of the paper as viewed in FIG. 2 dotted outline). The item 68 in its still lengthwise bowed condition causes the spring 22 to snap through the opening 12 to position 3 (FIG. 2) also identified in outline form. At this point, the item is in free ballistic flight. Once the trailing edge of the item passes beyond the initial bend of the spring 22 the spring snaps backwardly position 4 against the item, effectively pushing the item quickly out the path of the next incoming item whereupon the item bottoms within the pocket receptacle against the two brushes 44—44 and the resilient member 56. Any tendancy for the item to "bounce back" away from the pocket or receptacle bottom is resisted or thwarted by the bristles of the brushes 44—44. The resilient member 56 acts to prevent the item 68 from hanging up on the switch actuator projection 70 and enables the items to slide easily thereover on entering the pocket thus avoiding any erroneous switch closings or jiggling of the switch actuator leading to false switch actuation indications.

It is noted that the construction of the gate assembly with the elongated slotted opening and the curve formation of the spring 22 causes the spring to act in a wave-like motion from the narrow end of the assembly to the larger end as each bowed document is received within the receptacle area. Also, it should be noted that the effect of the wave spring is to automatically insure that the documents are guided quickly out of the way of the incoming items. In addition to the action of the wave spring, the gate assembly itself is provided with the slanted portion 30 which in conjunction with the collimation maintaining portion of the assembly 10 i.e., the bowed condition, causes the documents to be led away from the gate assembly and further back into the pocket, thus assuring positive and accurate stacking of the items in the specific order in which they enter without jam ups, collisions or overlaps.

I claim:

1. Guide arm apparatus providing an entering wall back-up deflecting assembly for use with an item sorter/reader stacker having an entering end and a terminal end portion comprising;

an elongated rigid member having means at opposite ends thereof for pluggably, vertically mounting said rigid member into an item pathway terminal area effective thereby to form a side wall for entering items at a terminal area in an item pathway, a wave spring member operably connected to said rigid member and being capable of curvilinearly flexing from right to left of the center of said rigid member and return without permanent deformation, means operably connected to the terminal end of said rigid member preventing reverse deflection of the entering items with respect to the terminal end portion of said rigid member, and flexible means operably mounted to the terminal end of said rigid member for contact on one side thereof with each item and for contact on the opposite side thereof with an operably associated switch mechanism with which said rigid member is operably associated.

2. The invention in accordance with claim 1 wherein said rigid member is tapered in two dimensions, both longitudionally and vertically and wherein said mounting means comprises oppositely disposed pedestal members integral with opposite ends of said rigid member.

3. The invention in accordance with claim 1 wherein said rigid member further includes an elongated, longitudionally extending opening and wherein said wave spring member is secured to said rigid member at opposite ends of said opening in such manner as to extend partially through said opening.

4. The invention in accordance with claim 3 wherein said wave spring is curvilinearly bowed throughout its length and is provided with a constantly changing radius of curvature from end to end thereof.

5. The invention in accordance with claim 1 wherein said rigid member is vertically bowed and wherein the upper portion of said terminal end of said member is vertically, rearwardly flared to provide means for supporting those items which are non self-supporting.

6. The invention in accordance with claim 1 wherein the terminal end of said rigid member is provided with an angular offset portion which portion is angled outwardly away from the main plane of said rigid member providing means for deflecting items impinging thereagainst so that said items are forced to move in a direction perpendicular to the main plane of said rigid member.

7. The invention in accordance with claim 1 wherein said means preventing reverse deflection of said items comprises a pair of oppositely disposed, finely bristled, brush members and wherein said brush members are pluggably, demountably connected to said rigid member.

8. The invention in accordance with claim 1 wherein said flexible means comprises an elongated snap, mounted, demountable strip-like member, at least a portion of said member being bent back upon itself and being provided with means for removeably mounting said flexible member on said rigid member.

9. The invention in accordance with claim 1 wherein said wave spring member further comprises an elongated, thin, metallic strip, fixed at opposite ends to said rigid member and permanently bowed with the largest radius of curvature disposed at the smallest end of said rigid member so that said strip is capable of flexure horizontally through the opening in said rigid member in response to contact with the incoming items.

* * * * *